April 15, 1941.  J. E. DUBE ET AL  2,238,808
REFRIGERATING SYSTEM
Filed Aug. 5, 1938
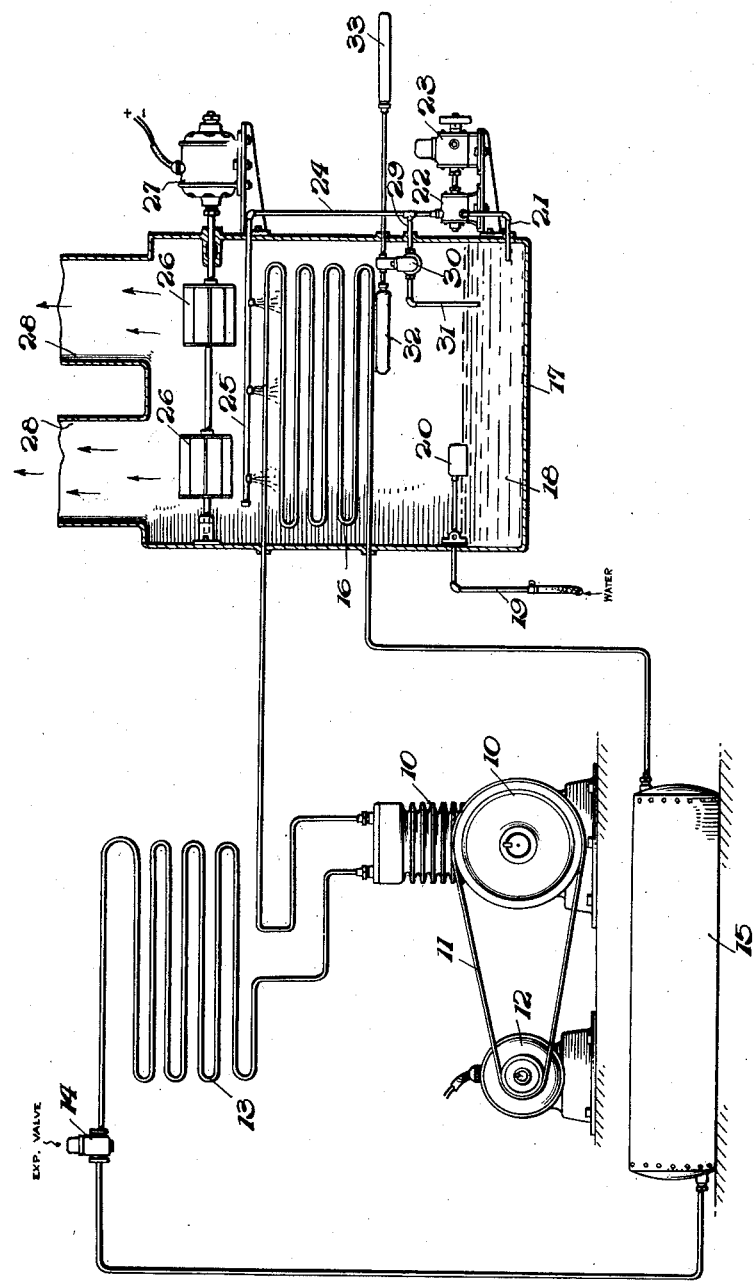
Inventors
John E. Dube
Norman W. Barnes
By Cameron, Kerkam + Sutton
Attorneys Patented Apr. 15, 1941

2,238,808

UNITED STATES PATENT OFFICE 2,238,808

REFRIGERATING SYSTEM

John E. Dube and Norman W. Barnes, Knoxville, Tenn., assignors to The Fulton Sylphon Company, Knoxville, Tenn., a corporation of Delaware Application August 5, 1938, Serial No. 223,347

9 Claims. (Cl. 62—3)

This invention relates to refrigerating systems, and more particularly to means for automatically controlling their operation under varying conditions of load.

Not only has the increased use of refrigerating systems imposed a serious load on water and sewage systems because of the consumption of water involved, but the cost of the water used has been a serious item to the operator of the system. Even though thermostatic controls have been employed for diminishing the water consumption, i. e., proportioning the water consumption to minimum requirements as established by the demands of the refrigerating system, the quantity of water used has in some localities made the water bill the largest item of expense in the operation of the installation. Accordingly, it has been proposed to provide refrigeration systems, particularly larger sized systems such as employed in commercial installations, with evaporative condensers in order to conserve water and reduce the cost of operation arising from consumption of cooling water. An evaporative condenser ordinarily consists of a condenser coil carrying the refrigerant on the inside and exteriorly cooled by water and air, the water being lifted from a sump by a pump to appropriate spray nozzles from which it descends over the condensing coils and returns to the sump, and the air being circulated through the unit in counterflow to the water to remove heat from the latter. Thus the same water is used over and over again except for such small replenishment as is required by evaporation.

While an evaporative condenser thus has the advantage of conserving water and correspondingly diminishing the cost of operation, the evaporative condenser has certain disadvantages which it is a purpose of this invention to overcome. The evaporative condenser must be large enough to take care of maximum load conditions, and therefore it is too large for lower load conditions. This results in excess cooling of the refrigerant under the lower load conditions. Moreover, it is a well known fact that the capacity of the compressor increases with decreasing head pressure, and as the compressor must also be large enough to take care of maximum load conditions and is thus too large for lower load conditions, the overcooling of the refrigerant under lower load conditions with the consequent decrease in the head pressure at the compressor results in a further increase in the capacity of the compressor, thereby accentuating the difficulties of control introduced by the excess capacity of the condenser and of the compressor per se under lower load conditions. These difficulties result in short cycling, prevent constant dehumidification, etc., as well as introduce mechanical difficulties due to the wear and tear on the apparatus arising from the frequent starting and stopping, intermittent operation, etc.

It is an object of this invention to provide an evaporative condenser with a control which automatically changes the compressor capacity with the load.

Another object of this invention is to provide an evaporative condenser with a control which automatically varies the condenser capacity with changes in load.

Another object of this invention is to provide a control for refrigerating apparatus of the type above characterized which may also be incorporated in refrigerating systems using a shell and tube or counterflow condenser and which will perform the additional function of conserving water as well as control the capacity of the condenser.

Another object of this invention is to provide a control for refrigerating apparatus of the type characterized which may also be applied to air cooled installations and water cooled installations of other than the evaporative condenser type.

Another object of this invention is to provide a refrigerating system with a control whereby the compressor capacity is made to vary in a predetermined relationship to the load by controlling the high side temperature of the system.

Another object of this invention is to provide a refrigerating system with a control whereby the condenser capacity is made to vary in a predetermined relationship to the load by controlling the high side temperature of the system.

Another object of the invention is to provide a refrigerating system with a control whereby the compressor capacity is made to vary in a predetermined relationship to the high side temperature of the system and the outside temperature.

Another object of this invention is to provide a refrigerating system with a control whereby the condenser capacity is made to vary in a predetermined relationship to the high side temperature of the system and the outside temperature.

Another object of this invention is to provide a refrigerating system with controlling means of the type characterized which are relatively simple in construction and certain and efficient in operation.

Other objects will appear as the description of the invention proceeds.

The invention is capable of receiving a variety of mechanical expressions, only one of which is illustrated on the accompanying drawing, but it is to be expressly understood that the drawing is for purposes of illustration only, and is not to be construed as a definition of the limits of the invention, reference being had to the appended claims for that purpose.

The drawing is a schematic or diagrammatic illustration of an embodiment of the present invention.

As shown, a compressor 10 of any suitable capacity, size, construction, etc., is driven in any suitable way, as by a belt 11, from a motor 12. An evaporator, diagrammatically indicated at 13, is in communication with the compressor 10 at one end and, through expansion valve 14, with the liquid receiver 15 at its other end. Also communicating with the compressor 10 and receiver 15 is a condenser coil 16 of any suitable size, construction and capacity. It is to be understood that the foregoing elements may be the component elements of any suitable refrigerating system, such as now in common use, and as the details thereof constitute no part of the present invention further description thereof is deemed unnecessary.

Condenser coil 16 is shown as forming a part of an evaporative condenser provided with a housing 17 which at its lower portion forms a sump 18 to which make-up water is admitted through pipe 19 under the control of a float-operated valve diagrammatically indicated at 20. Communicating with the sump 18 is the inlet pipe 21 of a pump 22 driven by an electric motor or other suitable means 23, said pump 22 having its outlet in communication through pipe 24 with spray means composed of any suitable number of nozzles of any suitable form and construction diagrammatically indicated at 25, whereby the water delivered by said spray flows downwardly over the condenser coil 16 and is returned to the sump 18. Disposed above the spray 25 are one or more fans 26 driven by an electric motor 27 or in any other suitable way, said fans drawing air into the housing 17 through any suitable openings below the level of the condenser 16 and discharging the air through one or more outlet passages 28. Thus air is circulated over the condenser coil in the opposite direction to that in which the water is flowing, and heat abstracted from the coil by the water is in turn abstracted from the water by the air, with only such consumption of water as involved in unavoidable evaporation. Motors 23 and 27 may be suitably connected to motor 12 so that the pump and fan motors are in operation only when the compressor motor is in operation, or any other suitable arrangement may be provided. So far the description of the evaporative condenser is that of a known type of evaporative condenser, but it is to be expressly understood that the evaporative condenser may be of any suitable form, construction, capacity, etc., as its details of construction in so far as the elements already described are concerned form no part of the present invention except as they enter into combination with the control next to be described.

In communication with the outlet pipe 24 is a by-pass conduit 29 adapted to return a predetermined proportion of the water delivered by the pump 22 back to the sump 18 through a control valve 30 and conduit 31. Control valve 30 may be of any suitable construction, its details forming no part of the present invention, except that it is a thermostatic valve, preferably of the liquid expansion type, including a temperature responsive element, shown as a bulb 32, mounted in any suitable way so as to be responsive to the temperature of the refrigerant in the condenser 16, and so connected to the valve 30 that a decrease in temperature at 32 results in an opening of the valve 30 and therefore an increase in the flow of water through the by-pass 29—31 with concomitant decrease of water flow to spray 25.

While within the broader aspects of the present invention, as will be apparent to one skilled in the art, control of the by-pass from the high side temperature of the system at the condenser will obtain some of the advantages of the present invention, the control is preferably provided with means whereby the capacity of the compressor is also automatically varied with the load on the refrigerating system. To this end the thermostatically operated valve 30 is also preferably provided with a second control, which will be referred to as an outside temperature control, but without intending thereby to imply that outdoor temperature is necessarily the controlling temperature, but rather that the second source of control is outside of the refrigerating system proper. As shown, a second bulb 33 adapted to be mounted in any suitable way so as to subject the same to any suitable outside temperature is also connected to the valve 30, and is preferably in open communication with the bulb 32 and a single motor vessel or pressure responsive element at the valve 30 so that a decrease in outside temperature will also result in an opening of the valve 30 to increase flow of water through the by-pass with a concomitant decrease of flow through the spray 25.

To illustrate the operation of the system above described, let it be assumed that a refrigeration capacity of twenty-five tons is required when the outside temperature is 100° F. and that the compressor has been chosen to meet this specification for a given evaporator temperature and a high side temperature of say 110° F. Under these conditions the compressor and condenser are operating at substantially full capacity, the by-pass valve 30 is closed, and all of the water is circulated to the spray 25. Now let us assume that the outside temperature drops to 75° F. If all the water continued to pass to the spray 25 the high side temperature might drop for example to 90° F., which would increase the capacity of the compressor to say twenty-nine tons notwithstanding that the decrease in load represented by the drop of outside temperature should correspond with a compressor capacity of say ten tons. Thus instead of the capacity of the compressor decreasing with the decrease in load, it is actually increased because of the decrease in temperature at the condenser arising from the excess cooling due to the continued and full operation of the spray 25.

In accordance with the present invention, however, either the decrease in the high side temperature at bulb 32, or the decrease in the outside temperature at bulb 33, or both, results in a corresponding opening of the valve 30 to decrease the amount of water flowing to the spray. The thermostatically operated valve may be so constructed as to maintain a fixed high side temperature, or it may be so constructed as to actually increase the high side temperature to compensate in part at least for the change in capacity of the compressor due to changing load; in other words, while the high side temperature may be maintained constant for varying loads as represented by varying outside temperatures, the high side temperature may be actually raised with decreasing outside temperature to decrease the compressor capacity as the load decreases. It may not be possible to decrease the compressor capacity to the full extent to which the load is decreased, but a very substantial decrease in compressor capacity, say on the order of 30%, may be readily obtained.

The aforesaid control of the condenser to prevent increase in capacity of the compressor with decreasing load, and preferably to decrease the capacity of the compressor with decreasing load, thereby results, if not in a continuous operation of the compressor, at least a running of the compressor for a materially larger percentage of the time so as to minimize mechanical and electrical difficulties incident to short cycling, to make possible a more continuous dehumidification, and otherwise improve the operation and regulation of the system as will be apparent to one skilled in the art.

The present invention may also be embodied in other than evaporative types of condenser. Thus if cooling is effected entirely by air circulation, the thermostatic control of the present invention may be employed to vary the quantities of air flowing through the condenser, and if the invention is embodied in a condenser of the shell and tube type, it will not only adjust the water flow to vary the condenser capacity with varying loads but will also function to save water as will be apparent. It will also be seen that by means of the present invention the compressor capacity may also be controlled entirely from the outside temperature by omission of the bulb 32.

It will thus be perceived that the present invention provides an improved control whereby the compressor capacity may be controlled under varying loads so as to prevent increase of compressor capacity under decrease of load or so as to decrease the compressor capacity as the load decreases. Thus a decrease of the refrigerant temperature at the condenser may be prevented to avoid a decrease in head pressure at the compressor, or the temperature of the refrigerant at the condenser may actually be increased to increase the head pressure at the compressor. Furthermore, the regulation may be effected from either the temperature at the condenser, or from the outside temperature, or both, and in the latter event the controls may be separate or conjoint, but preferably the thermostatically operated valve is of such construction that both bulbs are in open communication with each other and with the pressure responsive element at the valve 30 so that the valve is moved toward open position for a decrease in temperature at either the condenser or the outside. It will also be perceived that the invention may be readily embodied in relatively simple elements that are easy to install, and that the control of the system therefrom is certain and efficient.

While the embodiment of the invention illustrated on the drawing has been described with considerable particularity, it is to be expressly understood that the invention may receive a variety of mechanical expressions, some of which will now suggest themselves to those skilled in the art, while changes may be made in the details of construction, arrangement, proportion, etc., of the parts, and certain features may be used without other features without departing from the spirit of the invention. Thus, while the control for the by-pass valve is preferably of the liquid expansion type employing one or more bulbs in open communication with the motor vessel of a type well known in the art, it is to be expressly understood that the invention is not restricted to the use of a valve of this type and construction, as any suitable thermostatically operated valve functioning in conformity with the principles herein explained may be employed if desired. Reference is therefore to be had to the appended claims for a definition of the invention.

What is claimed is:

1. In a refrigerating system, in combination with the compressor and condenser thereof and means providing a flow of cooling medium through the condenser, means for proportionately decreasing the capacity of the condenser if the temperature of the refrigerant or the temperature of the outside air tends to decrease including means for controlling the flow of cooling medium through said condenser and thermostatic means subjected to the high side temperature of said system and to the temperature of the outside air for operating said last-named means to decrease the rate of cooling medium flow in accordance with the variation in said temperatures.

2. In a refrigerating system, in combination with the compressor thereof and an evaporative condenser in communication with said compressor and including means for circulating cooling water to and from a spray and a sump, a by-pass in said circulating system for returning water to the sump without passing through said spray, a valve in said by-pass for varying the quantity of water flowing through said by-pass and therefore said spray, and thermostatically operated means for operating said valve to increase the by-pass flow upon decrease in load on said refrigerating system.

3. In a refrigerating system, in combination with the compressor thereof and an evaporative condenser in communication with said compressor and including means for circulating cooling water to and from a spray and a sump, a by-pass in said circulating system for returning water to the sump without passing through said spray, a valve in said by-pass for varying the quantity of water flowing through said by-pass and therefore said spray, and thermostatically operated means subjected to the temperature of the refrigerant in said condenser for operating said valve to increase the by-pass flow if the refrigerant temperature in said condenser tends to decrease.

4. In a refrigerating system, in combination with the compressor thereof and an evaporative condenser in communication with said compressor and including means for circulating cooling water to and from a spray and a sump, a by-pass in said circulating system for returning water to the sump without passing through said spray, a valve in said by-pass for varying the quantity of water flowing through said by-pass and therefore said spray, and thermostatically operated means subjected to outside temperature for operating said valve to increase the by-pass flow upon decrease in the outside temperature.

5. In a refrigerating system, in combination with the compressor thereof and an evaporative condenser in communication with said compressor and including means for circulating cooling water to and from a spray and a sump, a by-pass in said circulating system for returning water to the sump without passing through said spray, a valve in said by-pass for varying the quantity of water flowing through said by-pass and therefore said spray, and thermostatically operated means subjected to at least one source of varying temperature that may reflect the load on the system to decrease the condenser capacity with decrease of load.

6. In a refrigerating system, in combination with the compressor thereof and an evaporative condenser in communication with said compressor and including means for circulating cooling water to and from a spray and a sump, a by-pass in said circulating system for returning water to the sump without passing through said spray, a valve in said by-pass for varying the quantity of water flowing through said by-pass and therefore said spray, and thermostatically operated means subjected to at least one source of varying temperature that may reflect the load on the system to decrease the compressor capacity with decrease in load.

7. In a refrigerating system, in combination with the compressor thereof and an evaporative condenser in communication with said compressor and including means for circulating cooling water to and from a spray and a sump, a by-pass in said circulating system for returning water to the sump without passing through said spray, a pressure-operated valve in said by-pass for varying the quantity of water flowing through said by-pass and therefore said spray, and thermostatically operated means for varying the condenser capacity with variation in load including communicating bulbs in communication with the pressure responsive element of said valve and charged with a temperature responsive liquid, said bulbs being respectively subjected to the temperature of the refrigerant in said condenser and to the outside temperature.

8. In a refrigerating system in combination with the compressor thereof and an evaporative condenser in communication with said compressor and including means for circulating cooling water to and from a spray and a sump, a by-pass in said circulating system for returning water to the sump without passing through said spray, a valve in said by-pass for varying the quantity of water flowing through said by-pass and therefore said spray, and temperature responsive means for adjusting the capacity of said condenser including a thermostat subjected to the temperature of the refrigerant in said system for predeterminately opening said valve with a decrease in the temperature of the refrigerant.

9. In a refrigerating system in combination with the compressor thereof and an evaporative condenser in communication with said compressor and including means for circulating cooling water to and from a spray and a sump, a by-pass in said circulating system for returning water to the sump without passing through said spray, a valve in said by-pass for varying the quantity of water flowing through said by-pass and therefore said spray, and temperature responsive means for adjusting the capacity of said condenser including a thermostat subjected to the outside temperature for predeterminately opening said valve with a decrease in the outside temperature.

JOHN E. DUBE.
NORMAN W. BARNES.